United States Patent
Gross et al.

(10) Patent No.: US 10,982,165 B2
(45) Date of Patent: Apr. 20, 2021

(54) LOW-FRICTION AND LOW-ADHESION MATERIALS AND COATINGS

(71) Applicant: HRL Laboratories, LLC, Malibu, CA (US)

(72) Inventors: Adam F. Gross, Santa Monica, CA (US); Andrew P. Nowak, Los Angeles, CA (US); Larken E. Cumberland, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/419,216

(22) Filed: May 22, 2019

(65) Prior Publication Data
US 2019/0270944 A1    Sep. 5, 2019

Related U.S. Application Data

(62) Division of application No. 14/658,188, filed on Mar. 14, 2015, now Pat. No. 10,344,244.

(Continued)

(51) Int. Cl.
*C08G 81/00*    (2006.01)
*C10M 171/00*    (2006.01)
(Continued)

(52) U.S. Cl.
CPC .......... *C10M 107/38* (2013.01); *C08G 81/00* (2013.01); *C09D 5/00* (2013.01); *C09D 187/005* (2013.01);
(Continued)

(58) Field of Classification Search
CPC ............................ C08G 81/00; C10M 171/00
See application file for complete search history.

(56) References Cited

U.S. PATENT DOCUMENTS

| | | |
|---|---|---|
| 3,810,874 A | 5/1974 | Mitsch et al. |
| 3,847,978 A | 11/1974 | Sianesi et al. |

(Continued)

OTHER PUBLICATIONS

Vaidya et al., "Synthesis and Surface Properties of Environmentally Responsive Segmented Polyurethanes," Journal of Colloid and Interface Science 249, 235-245 (2002).

(Continued)

*Primary Examiner* — Ellen M McAvoy
*Assistant Examiner* — Ming Cheung Po
(74) *Attorney, Agent, or Firm* — O'Connor & Company

(57) ABSTRACT

Disclosed are materials that possess both low adhesion and the ability to absorb water. The material passively absorbs water from the atmosphere and then expels this water upon impact with debris, to create a self-cleaning layer. The lubrication reduces friction and surface adhesion of the debris (such as an insect), which may then slide off the surface. The invention provides a material comprising a continuous matrix including a polymer having a low surface energy (less than 50 mJ/m$^2$) and a plurality of inclusions, dispersed within the matrix, each comprising a hygroscopic material. The continuous matrix and the inclusions form a lubricating surface layer in the presence of humidity. The material optionally contains porous nanostructures that (Continued)

inject water back onto the surface after an impact, absorbing water under pressure and then releasing water when the pressure is removed. The material may be a coating or a surface, for example.

9 Claims, 5 Drawing Sheets

Related U.S. Application Data

(60) Provisional application No. 61/953,093, filed on Mar. 14, 2014.

(51) Int. Cl.
| | |
|---|---|
| *C10M 107/38* | (2006.01) |
| *C09D 5/00* | (2006.01) |
| *C09D 187/00* | (2006.01) |
| *C10M 169/04* | (2006.01) |
| *C10N 10/06* | (2006.01) |
| *C10N 20/06* | (2006.01) |
| *C10N 20/00* | (2006.01) |
| *C10N 30/06* | (2006.01) |
| *C10N 50/02* | (2006.01) |
| *C10N 50/08* | (2006.01) |

(52) U.S. Cl.
CPC ...... *C10M 169/04* (2013.01); *C10M 169/041* (2013.01); *C10M 171/00* (2013.01); *C10M 2201/041* (2013.01); *C10M 2201/062* (2013.01); *C10M 2201/102* (2013.01); *C10M 2201/105* (2013.01); *C10M 2209/084* (2013.01); *C10M 2209/104* (2013.01); *C10M 2209/108* (2013.01); *C10M 2209/1045* (2013.01); *C10M 2209/12* (2013.01); *C10M 2213/023* (2013.01); *C10M 2213/0606* (2013.01); *C10M 2217/02* (2013.01); *C10M 2217/028* (2013.01); *C10M 2229/02* (2013.01); *C10M 2229/0515* (2013.01); *C10N 2010/06* (2013.01); *C10N 2020/06* (2013.01); *C10N 2020/09* (2020.05); *C10N 2030/06* (2013.01); *C10N 2050/02* (2013.01); *C10N 2050/08* (2013.01)

(56) References Cited

U.S. PATENT DOCUMENTS

| | | | |
|---|---|---|---|
| 4,197,380 A * | 4/1980 | Chao | C09J 123/08 525/199 |
| 5,032,666 A | 7/1991 | Hu et al. | |
| 5,084,315 A | 1/1992 | Karimi et al. | |
| 5,118,579 A * | 6/1992 | Aharoni | C09D 127/12 428/421 |
| 5,189,135 A | 2/1993 | Cozzi et al. | |
| 5,332,798 A | 7/1994 | Ferreri et al. | |
| 5,733,657 A * | 3/1998 | Macheras | B01D 53/228 210/500.23 |
| 5,736,249 A * | 4/1998 | Smith | B05D 5/00 428/413 |
| 5,912,291 A * | 6/1999 | Sterling | C08K 5/5406 524/263 |
| 6,926,937 B2 | 8/2005 | Extrand et al. | |
| 8,263,129 B2 * | 9/2012 | DeSimone | B82Y 10/00 424/489 |
| 2004/0019143 A1 | 1/2004 | Koloski et al. | |
| 2007/0100012 A1 * | 5/2007 | Beard | C08J 5/18 521/99 |
| 2011/0130077 A1 * | 6/2011 | Litke | B24B 37/24 451/41 |

OTHER PUBLICATIONS

Siochi et al., "Engineered Surfaces for Mitigation of Insect Residue Adhesion" NF1676L-15481 SAMPE 2013; May 6-9, 2013; Long Beach, CA; United States.

Wohl et al., "Evaluation of commercially available materials to mitigate insect residue adhesion on wing leading edge surfaces," Progress in Organic Coatings 76 (2013) 42-50.

Kok et al., "Influence of surface characteristics on insect residue adhesion to aircraft leading edge surfaces," Progress in Organic Coatings 76 (2013) 1567-1575.

Lee et al., "Zwitter-Wettability and Antifogging Coatings with Frost-Resisting Capabilities," ACS Nano 7 (2013) 2172-2185.

Chen et al., "Robust Prototypical Anti-icing Coatings with a Self-lubricating Liquid Water Layer between Ice and Substrate," ACS Appl. Mater. Interfaces 5 (2013) 4026-4030.

* cited by examiner

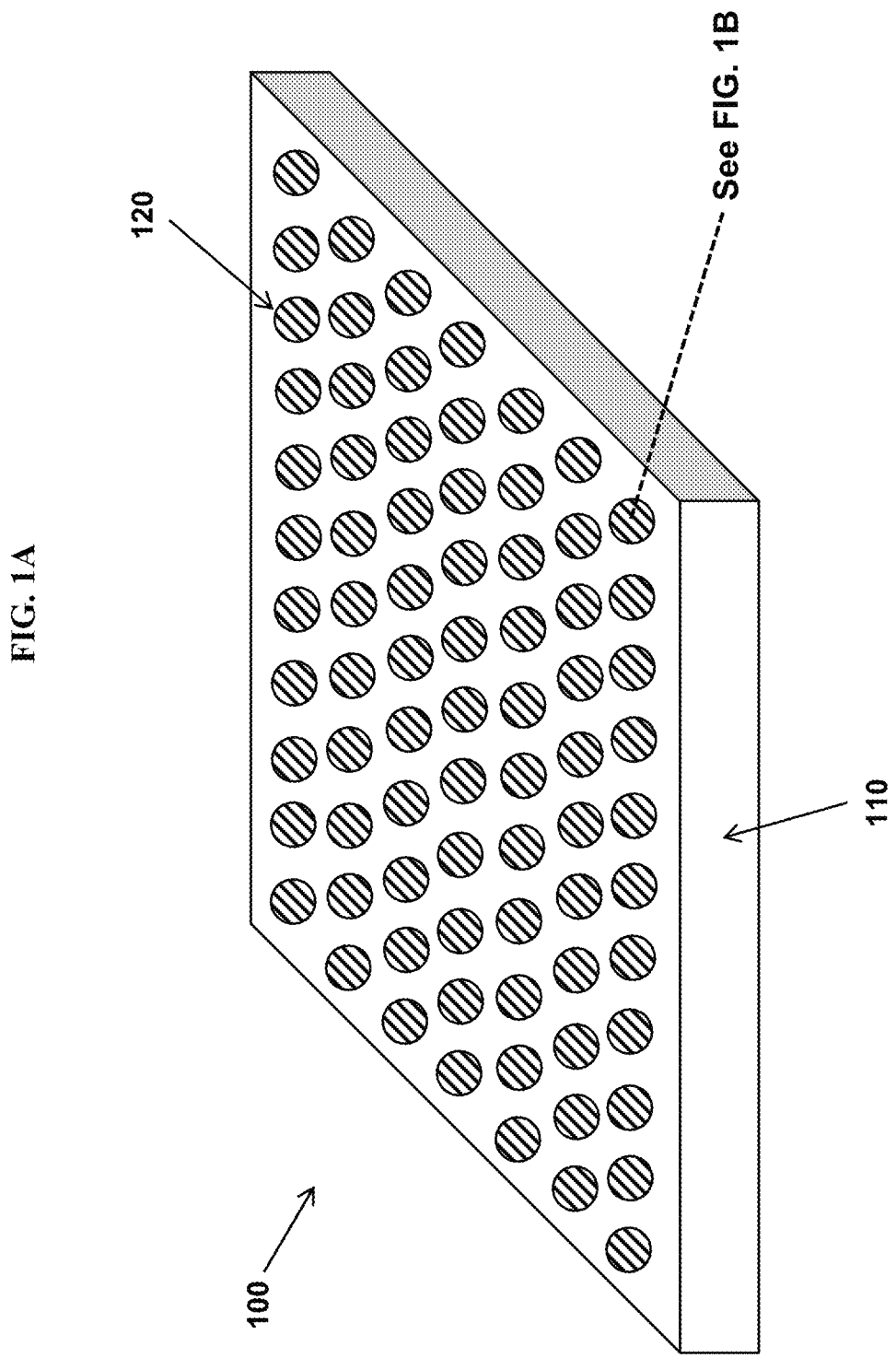

FIG. 4

| Sample | Contact angle water | Contact angle hexadecane | Friction constant 40-55% humidity | Friction constant 85% humidity | % decrease with humidity |
|---|---|---|---|---|---|
| Example 1 Hygroscopic-fluoro block polymer | 95° | 65° | 0.67 | 0.47 | 41% |
| Example 2 Hygroscopic-fluoro block polymer | 92° | 63° | 0.34 | 0.29 | 17% |
| Example 3 Fluoropolymer control | 97° | 65° | 0.93 | 0.7 | 25% |
| Example 4 Textured hygroscopic-fluoro block polymer | 95° | 55° | 0.36 | 0.29 | 21% |
| Example 5 Textured fluoropolymer | 86° | 61° | 0.60 | 0.47 | 22% |
| Example 6 PAA filled textured fluoropolymer | 82° | 77° | 0.84 | 0.55 | 34% |

LOW-FRICTION AND LOW-ADHESION MATERIALS AND COATINGS

PRIORITY DATA

This patent application is a divisional application of U.S. patent application Ser. No. 14/658,188, filed on Mar. 14, 2015 (now allowed), which claims priority to U.S. Provisional Patent App. No. 61/953,093, filed on Mar. 14, 2014, each of which is hereby incorporated by reference herein.

FIELD OF THE INVENTION

The present invention generally relates to low-friction, low-adhesion materials, coatings, and systems incorporating these.

BACKGROUND OF THE INVENTION

Coatings and materials can become soiled from debris (particles, insects, oils, etc.) impacting the surface. The debris affects airflow over the surface as well as aesthetics and normally is removed by washing.

Many attempts are described to mitigate insect accumulation during the early days of aircraft development. These include mechanical scrapers, deflectors, traps, in-flight detachable surfaces, in-flight dissolvable surfaces, viscous surface fluids, continuous washing fluids, and suction slots. The results of most of these trials were determined ineffective or impractical for commercial use.

Recently, Wohl et al., "Evaluation of commercially available materials to mitigate insect residue adhesion on wing leading edge surfaces," *Progress in Organic Coatings* 76 (2013) 42-50 describe work at NASA to create anti-insect adhesion or "bugphobic" surfaces. Wohl et al. tested the effect of organic-based coatings on insect adhesion to surfaces, but the results were unsuccessful. Wohl et al. also describe previously used approaches to reduce bug adhesion such as mechanical scrapers, deflectors, paper and/or other coverings, elastic surfaces, soluble films, and washing the surface continually with fluid.

One approach to this problem is to create a self-cleaning surface that removes debris from itself by controlling chemical interactions between the debris and the surface.

Superhydrophobic and superoleophobic surfaces create very high contact angles)(>150° between the surface and drops of water and oil, respectively. The high contact angles result in the drops rolling off the surface rather than remaining on the surface. These surfaces do not repel solid foreign matter or vapors of contaminants. Once soiled by impact, debris will remain on the surface and render it ineffective. Also, these surfaces lose function if the nanostructured top surface is scratched.

Fluoropolymer sheets or treated surfaces have low surface energies and thus low adhesion force between foreign matter and the surface. However, friction between impacting debris and the surface results in the sticking of contaminants.

Fluorofluid-filled surfaces have very low adhesion between impacting debris and the surface. However, if any of the fluid is lost, the surface cannot be refilled/renewed once applied on the vehicle, and thus loses its properties.

Enzyme-filled coatings leech out enzymes that dissolve debris on the surface. However, the enzymes are quickly depleted and cannot be refilled, rendering this approach impractical.

Kok et al., "Influence of surface characteristics on insect residue adhesion to aircraft leading edge surfaces," *Progress in Organic Coatings* 76 (2013) 1567-1575, describe various polymer, sol-gel, and superhydrophobic coatings tested for reduced insect adhesion after impact. The best-performing materials were high-roughness, superhydrophobic surfaces. However, they did not show that debris could be removed from the superhydrophobic surfaces once insects broke on the surface.

In view of the shortcomings in the art, improved materials and material systems are needed.

SUMMARY OF THE INVENTION

The present invention addresses the aforementioned needs in the art, as will now be summarized and then further described in detail below.

In some variations, the invention provides a low-friction, low-adhesion material comprising:

a substantially continuous matrix including a low-surface-energy polymer having a surface energy between about 5 mJ/m$^2$ to about 50 mJ/m$^2$, such as between about 10 mJ/m$^2$ to about 40 mJ/m$^2$; and a plurality of inclusions, dispersed within the matrix, each comprising a hygroscopic material, wherein the continuous matrix and the inclusions form a lubricating surface layer in the presence of humidity.

The material is characterized, according to some embodiments, by a water absorption capacity of at least 5 wt % water, preferably at least 10 wt % water, based on total weight of the material.

In some embodiments, the low-surface-energy polymer includes a fluoropolymer, such as (but not limited to) a fluoropolymer selected from the group consisting of perfluoroethers, fluoroacrylates, fluorosilicones, and combinations thereof. In these or other embodiments, the low-surface-energy polymer includes a siloxane.

In some embodiments, the hygroscopic material is selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacryalate, monoacrylate, and combinations thereof.

The low-surface-energy polymer and the hygroscopic material may be covalently connected in a block copolymer, in certain embodiments of the invention.

In some embodiments, the substantially continuous matrix is a three-dimensional template with wells containing the hygroscopic material. In other embodiments, the substantially continuous matrix is a three-dimensional template with pillars (i) containing the low-surface-energy polymer and (ii) surrounded by the hygroscopic material.

The material may be hydrophobic, i.e., characterized by an effective contact angle of water that is greater than 90°. The material may also be hydrophilic, i.e. characterized by an effective contact angle of water that is less than 90°. The material may also be lipophobic in some of these embodiments.

In some embodiments, the material is characterized by a coefficient of friction, measured at 50% relative humidity, less than 0.9. In these or other embodiments, the material is characterized by a coefficient of friction, measured at 85% relative humidity, less than 0.7.

The material may be characterized by a delay in the formation of ice on a surface of the material.

In various embodiments, the material is a coating and/or is present at a surface of an object or region.

In some variations, the invention provides a low-friction, low-adhesion hydrophobic or hydrophilic material comprising:

a substantially continuous matrix including a low-surface-energy polymer having a surface energy between about 5 mJ/m$^2$ to about 50 mJ/m$^2$;

a plurality of inclusions, dispersed within the matrix, each comprising a hygroscopic material; and a nanoporous material within at least some of the inclusions, wherein the nanopores have an average pore diameter less than 100 nanometers, wherein the continuous matrix and the inclusions form a lubricating surface layer in the presence of humidity.

In some embodiments, the material is characterized by a water absorption capacity of at least 5 wt % water based on total weight of the material.

In some embodiments, the low-surface-energy polymer is a polymer from the group consisting of perfluoroethers, fluoroacrylates, fluorosilicones, siloxanes, and combinations thereof.

The hygroscopic material may be selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof, for example.

In some embodiments, the nanoporous material comprises a hydrophobic component and/or is surface-modified to increase hydrophobicity. The nanoporous material may be selected from the group consisting of silica, alumina, silicates, aluminosilicates, carbonates, carbon, and combinations thereof, for example.

The material may be characterized by a coefficient of friction, measured at 50% relative humidity, less than 0.9 and/or a coefficient of friction, measured at 85% relative humidity, less than 0.7. The material may be characterized by a delay in the formation of ice on a surface of the material.

Some variations provide a precursor material for a low-friction, low-adhesion material, the precursor material comprising:

a hardenable material capable of forming a substantially continuous matrix, wherein the hardenable material includes a low-surface-energy polymer having a surface energy between about 5 mJ/m$^2$ to about 50 mJ/m$^2$; and a plurality of inclusions, dispersed within the hardenable material, each comprising a hygroscopic material.

In some embodiments of the precursor material, the surface energy of the polymer is between about 10 mJ/m$^2$ to about 40 mJ/m$^2$. The low-surface-energy polymer may be a fluoropolymer, for example, selected from the group consisting of perfluoroethers, fluoroacrylates, fluorosilicones, and combinations thereof. The low-surface-energy polymer may be a siloxane.

In some embodiments of the precursor material, the hygroscopic material is selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

The precursor material may further comprise a nanoporous material within at least some of the inclusions, wherein the nanopores have an average pore diameter less than 100 nanometers, and wherein the nanoporous material optionally comprises a hydrophobic component and/or optionally is surface-modified to increase hydrophobicity. The nanoporous material may be selected from the group consisting of silica, alumina, silicates, aluminosilicates, carbonates, carbon, and combinations thereof.

BRIEF DESCRIPTION OF THE DRAWINGS

FIG. 1A depicts the structure of some variations of the invention, providing a low-friction, low-adhesion material.

FIG. 4 includes a table of experimental data of friction change as well as water and oil contact angles, for Example 7.

DETAILED DESCRIPTION OF EMBODIMENTS OF THE INVENTION

Figure 1B:
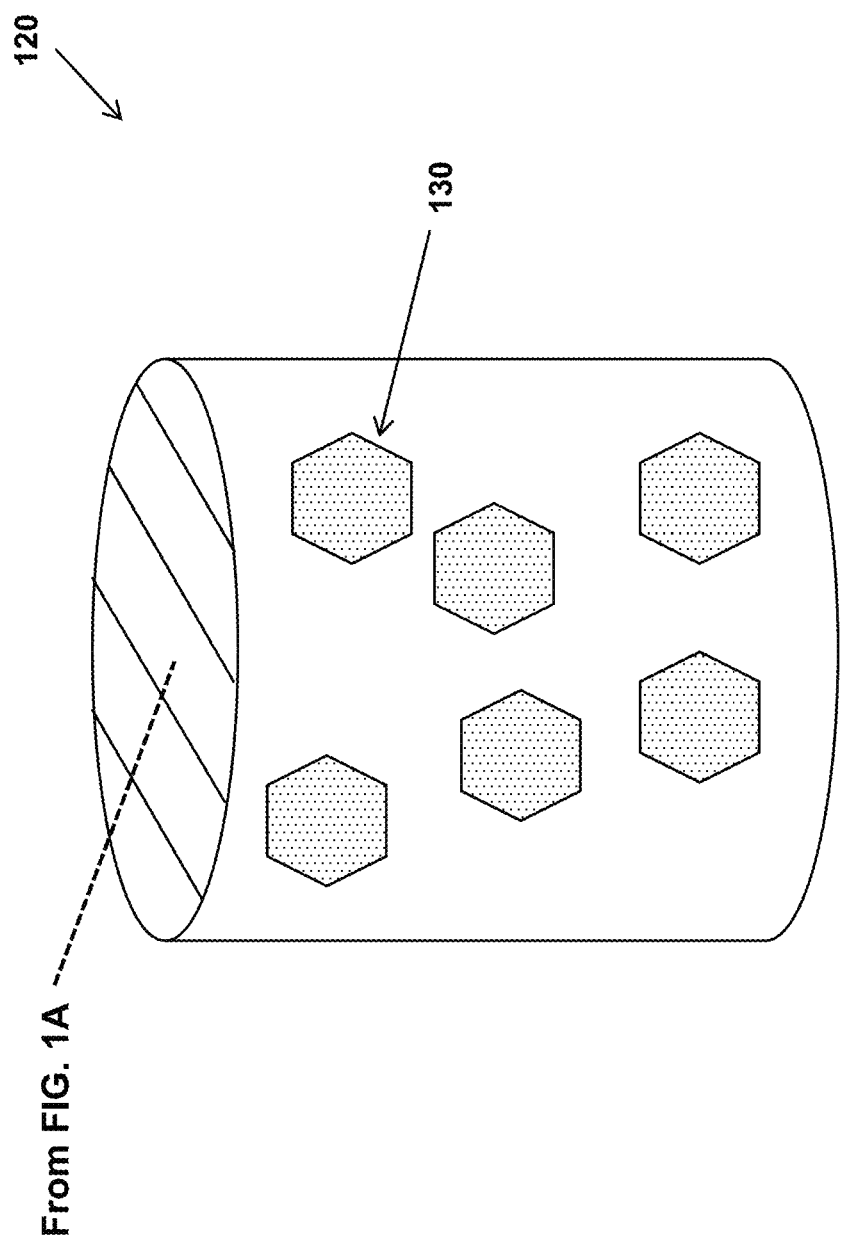
FIG. 1B depicts an exemplary sub-structure of an inclusion with a nanomaterial, in some embodiments of the invention.

The materials, compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Some variations of this invention are premised on the discovery of a material that possesses both low surface energy (for low adhesion) and the ability to absorb water. A hierarchically structured material or coating, as disclosed, passively absorbs water from the atmosphere and then expels this water upon impact with the impacting debris, to create a lubrication/self-cleaning layer and reduce the friction and adhesion of the impacting body (such as an insect) on the surface. Because these materials trap a layer of water near the surface, they also delay the formation of ice, in some embodiments. The material optionally contains porous nanostructures that inject water back onto the surface after an impact, absorbing water under pressure and then releasing water when the pressure is removed. The material may be used as a coating or as a surface.

In contrast to prior structures and methods, the disclosed material can absorb water from the air and use this water as a lubricant to wash and remove debris from the surface. The surface contains domains of a low-surface-energy polymer (such as, but not limited to, a fluoropolymer) providing low adhesion, and domains of a hygroscopic material that absorbs water and releases it back onto the surface during impact. The atmospheric water is thus captured as a lubricant and is a continually available, renewable resource. The domains of hygroscopic material exist throughout the material, in both planar and depth dimensions. The anti-adhesion function is retained even after abrasion of the top layer of the material.

Figure 2:
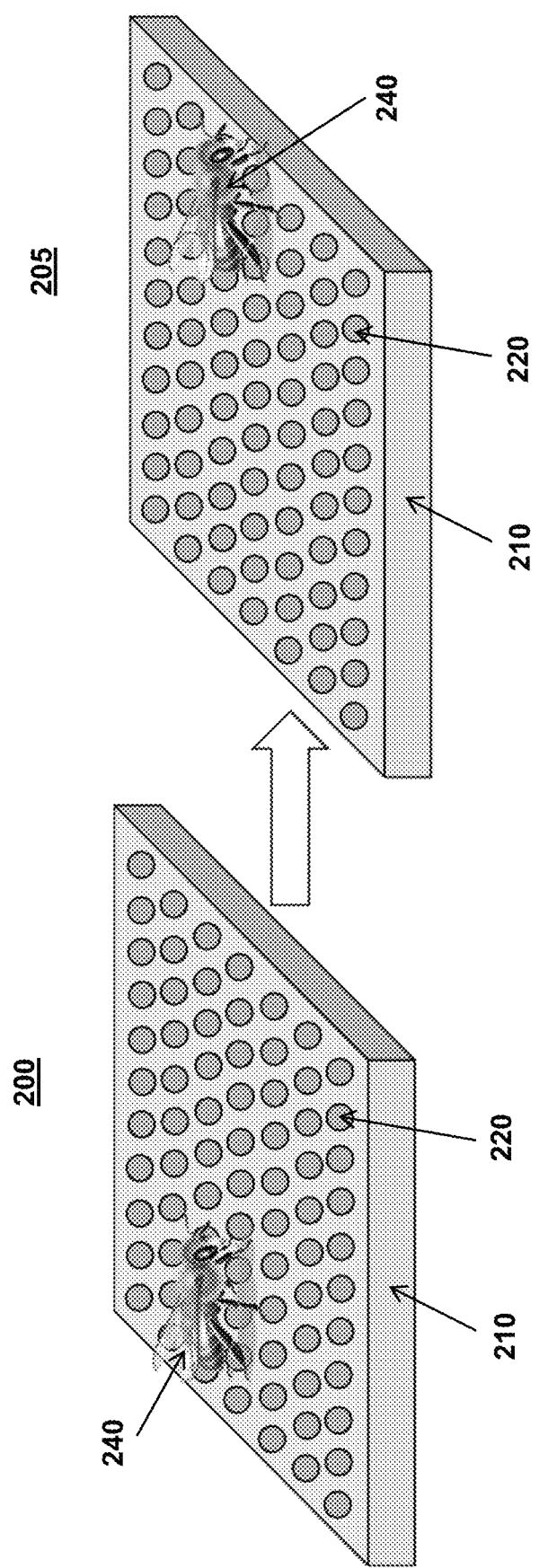
FIG. 2 illustrates the mode of action according to some variations, showing an insect sliding off the surface following impact.

The disclosed surface reduces the adhesion of debris by releasing water upon impact. The released water is utilized as a lubricant to reduce friction between debris and the surface. By reducing friction, the debris is less likely to embed in or otherwise attach to the surface and instead will slough off the surface (as illustrated in FIG. 2, where debris is depicted as a wasp).

Debris may be organic or inorganic and may include insects, dirt, dust, soot, ash, pollutants, particulates, ice, seeds, plant or animal fragments, plant or animal waste products, combinations or derivatives of any of the foregoing, and so on.

Variations of the invention include one or more of three aspects or principles. In a first aspect, low-friction and low-adhesion structures are created by a heterogeneous microstructure comprising a low-surface-energy polymer that is interspersed with hygroscopic domains (lubricating inclusions). Debris impacting the surface has low adhesion energy with the surface, due to the presence of the low-surface-energy polymer, and the debris will not remain on the surface.

In a second aspect, enhanced friction reduction and cleaning is provided from inclusions that collect aqueous lubricant from the environment and exude water upon impact with the surface. The energy of the impacting debris promotes increased water content at the interface, to act as a lubricant between debris and a surface, thus aiding in debris removal.

In a third aspect, nanostructures are contained in the hydroscopic inclusions. The nanostructures contain nanopores that help absorb energy (pressure) of impact, and absorb water during impact. The nanopores then rebound water to the surface for lubrication and cleaning.

The structure of some variations of the invention is shown in FIGS. 1A and 1B. FIG. 1A depicts the structure of a coating or surface with low-friction and self-cleaning properties, and FIG. 1B further depicts energy-absorption properties.

The structure 100 of FIG. 1 includes a continuous matrix 110. A "continuous matrix" (or equivalently, "substantially continuous matrix") means that the matrix material is present in a form that includes chemical bonds among molecules of the matrix material. An example of such chemical bonds is crosslinking bonds between polymer chains. In a substantially continuous matrix 110, there may be present various defects, cracks, broken bonds, impurities, additives, and so on.

The structure 100 further includes a plurality of inclusions 120, dispersed within the matrix 110, each of the inclusions 120 comprising a hygroscopic material. An exemplary inclusion 120, in some embodiments, is further depicted in FIG. 1B. The inclusion 120 of FIG. 1B includes a nanoporous material 130, wherein nanopores of the nanoporous material 130 have an average pore diameter less than 100 nanometers. The nanoporous material 130 is shown in FIG. 1B (which is not drawn to scale) as being dispersed as multiple nano-inclusions each containing nanoporous material 130. The nanoporous material 130 may also be dispersed more uniformly throughout the inclusion 120, and other geometric shapes are possible.

Optionally, the continuous matrix 110 may further comprise one or more additives selected from the group consisting of fillers, colorants, UV absorbers, defoamers, plasticizers, viscosity modifiers, density modifiers, catalysts, and scavengers.

The mode of action according to some variations is shown in FIG. 2. The structure of FIG. 2 includes a continuous matrix 210 and a plurality of inclusions 220. FIG. 2 illustrates the response of the surface 200 to an impact of debris, which in this illustration is an insect 240 (e.g., wasp), as a non-limiting example. The insect 240 slides across the surface (200/205) instead of breaking apart, ultimately leaving the surface 205 and thereby not leaving behind debris bound to the material.

In some variations, the invention provides a low-friction, low-adhesion material comprising:

a substantially continuous matrix including a low-surface-energy polymer having a surface energy between about 5 mJ/m$^2$ to about 50 mJ/m$^2$, such as about 10, 15, 20, 25, 30, 35, 40, or 45 mJ/m$^2$; and a plurality of inclusions, dispersed within the matrix, each comprising a hygroscopic material, wherein the continuous matrix and the inclusions form a lubricating surface layer in the presence of humidity.

A wide range of concentrations of components may be present in the low-friction, low-adhesion material. For example, the continuous matrix may be from about 5 wt % to about 95 wt %, such as from about 10 wt % to about 50 wt % of the material. The hygroscopic inclusions may be from about 1 wt % to about 90 wt %, such as from about 10 wt % to about 50 wt % of the coating.

Within the continuous matrix, the low-surface-energy polymer may be from about 50 wt % to 100 wt %, such as about 60, 70, 80, 90, 95, or 100 wt %. Within the inclusions, the hygroscopic material may be from about 50 wt % to 100 wt %, such as about 60, 70, 80, 90, 95, or 100 wt %.

The material is characterized, according to some embodiments, by a water absorption capacity of at least 1, 2, 3, 4, 5, 6, 7, 8, or 9 wt % water, preferably at least 10, 11, 12, 13, 14, 15, 16, 17, 18, 19, or 20 wt % water, based on total weight of the material.

As meant herein, a "low-surface-energy polymer" means a polymer, or a polymer-containing material, with a surface energy of no greater than 50 mJ/m². The principles of the invention may be applied to low-surface-energy materials with a surface energy of no greater than 50 mJ/m², in general (i.e., not necessarily limited to polymers).

In some embodiments, the low-surface-energy polymer includes a fluoropolymer, such as (but not limited to) a fluoropolymer selected from the group consisting of perfluoroethers, fluoroacrylates, fluorosilicones, and combinations thereof.

In these or other embodiments, the low-surface-energy polymer includes a siloxane. A siloxane contains at least one Si—O—Si linkage. The low-surface-energy polymer may consist of polymerized siloxanes or polysiloxanes (also known as silicones). One example is polydimethylsiloxane.

In some embodiments, the hygroscopic material is selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacryalate, monoacrylate, and combinations thereof.

In certain embodiments, the hygroscopic material is also classified as a hydrophilic material. A hygroscopic substance will actively attract and absorb water, without necessarily bonding. A hydrophilic substance will bond, on a molecular level, with water.

Figure 3:
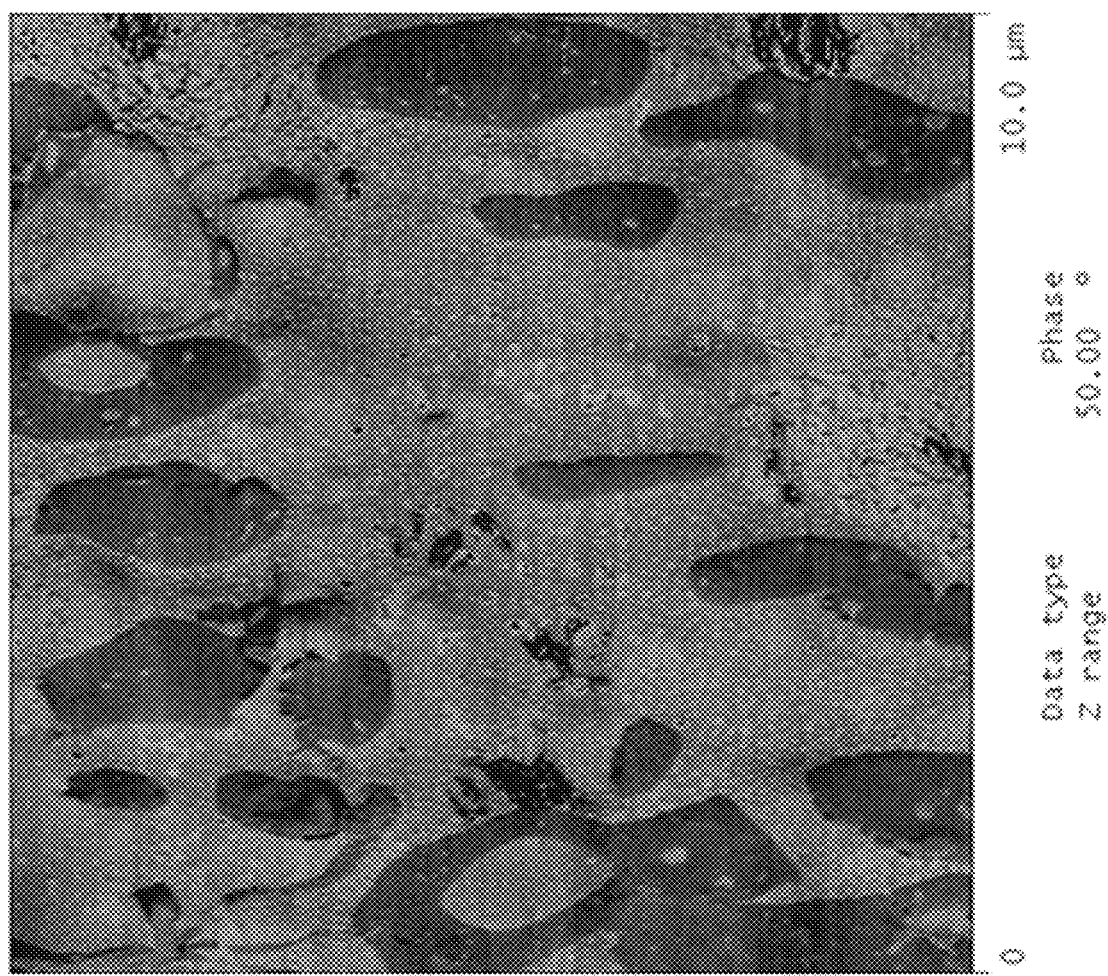
FIG. 3 shows a phase-contrast AFM image of a through-depth section of material according to Example 1.

The plurality of inclusions may include 2, 3, 4, 5, 10, 20, 30, 40, 50, 75, 100, or more inclusions comprising hygroscopic material within a region of low-friction, low-adhesion material (see e.g. FIG. 3). The low-surface-energy polymer and the hygroscopic material are phase-separated, i.e. they do not form a single continuous phase.

The hygroscopic inclusions are three-dimensional objects or domains, which may be of any shape, geometry, or aspect ratio. In a three-dimensional object, an aspect ratio of exactly 1.0 means that all three characteristic length scales are identical, such as in a perfect cube. The aspect ratio of a perfect sphere is also 1.0. The hygroscopic inclusions may be geometrically symmetric or asymmetric. Randomly shaped asymmetric templates are, generally speaking, geometrically asymmetric. In some embodiments, hygroscopic inclusions are geometrically symmetric. Examples include cylinders, cones, rectangular prisms, pyramids, or three-dimensional stars.

In some embodiments, the hygroscopic inclusions are anisotropic. As meant herein, "anisotropic" templates have at least one chemical or physical property that is directionally dependent. When measured along different axes, an anisotropic template will have some variation in a measurable property. The property may be physical (e.g., geometrical) or chemical in nature, or both. The property that varies along multiple axes may simply be the presence of mass; for example, a perfect sphere would be geometrically isotropic while a three-dimensional star shape would be anisotropic. A chemically anisotropic inclusion may vary in composition from the surface to the bulk phase, such as via a chemically modified surface. The amount of variation of a chemical or physical property, measured along different axes, may be 5%, 10%, 20%, 30%, 40%, 50%, 75%, 100% or more.

The hygroscopic inclusions may be characterized as templates, domains, or regions. The hygroscopic inclusions are not a single, continuous framework in the coating. Rather, the hygroscopic inclusions are non-continuous and dispersed in the continuous matrix. The hygroscopic inclusions are preferably dispersed uniformly within the continuous matrix.

The hygroscopic inclusions themselves may possess multiple length scales. For example, the hygroscopic inclusions may have an average overall particle size as well as another length scale associated with porosity, surface area, surface layer, sub-layer, protrusions, or other physical features.

The low-surface-energy polymer and the hygroscopic material may be covalently connected in a block copolymer, in certain embodiments of the invention. In this context, "covalently connected" refers to chemical bonds within the block copolymer that bond at least a portion of the low-surface-energy polymer with the hygroscopic material. This polymer may be a flat sheet or a polymer film with 3D texture, such as pillars or wells.

In embodiments without such a block copolymer, the low-surface-energy polymer and the hygroscopic material are present as a plurality of inclusions, dispersed within a substantially continuous matrix including a low-surface-energy polymer. There may be, but is not necessarily, some degree of chemical and/or physical bonding between the low-surface-energy polymer and the hygroscopic material.

In some embodiments, the substantially continuous matrix is a three-dimensional template with wells (depressions in the low-surface-energy polymer continuous matrix) containing the hygroscopic material in the well spaces. In other embodiments, the substantially continuous matrix is a three-dimensional template that includes pillars made from, and containing, the low-surface-energy polymer. The pillars are surrounded by the hygroscopic material. In this type of structure, the plurality of inclusions (domains) can be regarded either as the regions of hygroscopic material surrounding each pillar, or as the hygroscopic material filling the space between adjacent pillars, for example.

The material may be hydrophobic, i.e., characterized by an effective contact angle of water that is greater than 90°. The material may also be hydrophilic, i.e. characterized by an effective contact angle of water that is less than 90°. In various embodiments, the material is characterized by an effective contact angle of water of about 70°, 75°, 80°, 85°, 90°, 95°, 100°, or higher.

The material may also be lipophobic or partially lipophobic in some embodiments. In various embodiments, the material is characterized by an effective contact angle of hexadecane (as a measure of lipophobicity) of about 50°, 55°, 60°, 65°, 70°, 75°, 80°, 85°, 90°, or higher.

The material may simultaneously have hydrophobic and lipophobic properties. In certain embodiments, the material is characterized by an effective contact angle of water of at least 90° (such as about 95-100°) and simultaneously an effective contact angle of hexadecane of at least 60° (such as about 65°). In certain embodiments, the material is characterized by an effective contact angle of water of at least 80° (such as about 80-85°) and simultaneously an effective contact angle of hexadecane of at least 70° (such as about 75-80°).

In some embodiments, the material is characterized by a coefficient of friction, measured at 40-55% (e.g. 50%) relative humidity and room temperature, less than 1, 0.9, 0.8, 0.7, 0.6, 0.5, 0.4, or 0.3. In these or other embodiments, the material is characterized by a coefficient of friction, measured at 85% relative humidity and room temperature, less than 0.8, 0.7, 0.6, 0.5, 0.4, 0.3, or 0.2.

The coefficient of friction is relatively low due to the presence of a lubricating surface layer. By a "lubricating surface layer in the presence of humidity," it is meant a layer, multiple layers, a partial layer, or an amount of substance that lubricates the substrate such that it has a lower coefficient of friction compared to the substrate without the material present, when in the presence of some amount of atmospheric humidity.

The specific level of humidity is not regarded as critical, but in general may range from about 1% to 100%, typically about 30% to about 70% relative humidity. Relative humidity is the ratio of the water vapor density (mass per unit volume) to the saturation water vapor density. Relative humidity is also approximately the ratio of the actual to the saturation vapor pressure.

The substance that lubricates the substrate is primarily water, but it should be noted that other components may be present in the lubricating surface layer, including oils, metals, dust, dissolved gases, dissolved aqueous components, suspended non-aqueous components, fragments of debris, fragments of polymers, and so on.

The material may be characterized by a delay in the formation of ice on a surface of the material. For example, when a material surface is held at −10° C., the material provided by the invention may be characterized by a delay in the formation of ice on the surface of at least about 1, 2, 3, 4, 5, 10, 15, 20, 25, 30 minutes, or more.

In various embodiments, the material is a coating and/or is present at a surface of an object or region. The material may be utilized in relatively small applications, such as lens coatings, or for large structures, such as aircraft wings. In principle, the material could be present within a bulk region of an object or part, or could contain a temporary, protective laminating film for storage or transport, which is later removed for use of the material.

The continuous matrix offers durability, impact resistance, and abrasion resistance to the coating. There is homogeneity through the z-direction of the film, so that if some portion of the coating is lost (despite the resistance to abrasion), the remainder retains the desired properties. The coating offers a repeating, self-similar structure that allows the coating to be abraded during use while retaining properties. Should the surface be modified due to environmental events or influences, the self-similar nature of the coating allows the freshly exposed surface to present a coating identical to that which was removed.

In some variations, the invention provides a low-friction, low-adhesion hydrophobic or hydrophilic material comprising:

a substantially continuous matrix including a low-surface-energy polymer having a surface energy between about 5 mJ/m$^2$ to about 50 mJ/m$^2$;

a plurality of inclusions, dispersed within the matrix, each comprising a hygroscopic material; and a nanoporous material within at least some of the inclusions, wherein the nanopores have an average pore diameter preferably less than 100 nanometers (such as less than 90, 80, 70, 60, 50, 40, 30, 20, or 10 nanometers), wherein the continuous matrix and the inclusions form a lubricating surface layer in the presence of humidity.

In some embodiments, the material is characterized by a water absorption capacity of at least 5, 10, 15, or 20 wt % water based on total weight of the material.

In some embodiments, the low-surface-energy polymer is a polymer from the group consisting of perfluoroethers, fluoroacrylates, fluorosilicones, siloxanes, and combinations thereof.

The hygroscopic material may be selected from the group consisting of poly(acrylic acid), poly(ethylene glycol), poly (2-hydroxyethyl methacrylate), poly(vinyl imidazole), poly (2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof, for example. The water uptake of various polymers is described in *J. Mater. Chem.* (17) 2007, 4864-4871, which is hereby incorporated by reference herein.

In some embodiments, the nanoporous material comprises a hydrophobic component and/or is surface-modified to increase hydrophobicity. The nanoporous material may be selected from the group consisting of silica, alumina, silicates, aluminosilicates, carbonates, carbon, and combinations thereof, for example.

In some embodiments, with reference to FIG. 1B, nanoparticles 130 comprise a nanomaterial selected from the group consisting of silica, alumina, titania, zinc oxide, polytetrafluoroethylene, polystyrene, polyurethane, silicones, and combinations thereof. In certain embodiments, the nanoparticles 130 comprise silica. Other nanoparticles 130 are possible, as will be appreciated. Optionally, the nanoparticles 130 may be surface-modified with a hydrophobic material, such as (but not limited to) silanes including alkylsilane, fluoroalkylsilane, alkyldisilazane (e.g., hexamethyldisilazane), or poly(dimethylsiloxane).

The nanoporous material preferably contains pores less than 100 nm in diameter. In some embodiments, the nanoporous material is inherently hydrophobic. Alternatively, or additionally, the nanopores may be coated with a hydrophobic surface treatment.

The nanopores have a capillary pressure p$_c$ that depends on the pore diameter r, the surface tension of water γ, and the contact angle of water on the pore surface θ.

$$p_c = \frac{2\gamma\cos\theta}{r}$$

The capillary pressure p$_c$ will push against water infiltration. Only during impact will the surrounding pressure increase and water will be forced into the pore. Immediately after impact, water is forced out of the pores at the capillary pressure and will flood onto the surface to help wash away debris. See Kong et al., "Energy absorption of nanoporous silica particles in aqueous solutions of sodium chloride," *Phys. Scr.* 74 (2006) 531-534, which is hereby incorporated by reference herein, for its teachings regarding nanoporous energy absorbers which may be employed for water absorption and rejection. The impact pressure from debris on the surface of the material may be calculated using Appendix A1 in Jilbert and Field, "Synergistic effects of rain and sand erosion," *Wear* 243 (2000) 6-17, which is hereby incorporated by reference herein.

When nanoparticles are dispersed within the continuous matrix, the nanoparticles may be either located within the hygroscopic inclusions or separately dispersed within the continuous matrix (or both of these). The nanoparticles preferably have a length scale from about 5 nm to about 100 nm, such as about 10 nm to about 50 nm. Here, a nanoparticle length scale refers for example to a diameter of a sphere, a height or width of a rectangle, a height or diameter of a cylinder, a length of a cube, an effective diameter of a nanoparticle with arbitrary shape, and so on.

The nanoparticles may be chemically and/or physically bonded to, located within, or otherwise associated with, the hygroscopic inclusions. Alternatively, or additionally, the nanoparticles may be dispersed uniformly within the continuous matrix but not necessarily directly associated with the hygroscopic inclusions.

A wide range of concentrations of components may be present in the material. For example, the continuous matrix may be from about 5 wt % to about 95 wt %, such as from about 10 wt % to about 50 wt % of the material. The hygroscopic inclusions may be from about 1 wt % to about 90 wt %, such as from about 10 wt % to about 50 wt % of the coating. The nanoparticles may be from about 0.1 wt % to about 25 wt %, such as from about 1 wt % to about 10 wt % of the material.

Within the continuous matrix, the low-surface-energy polymer may be from about 50 wt % to 100 wt %, such as about 60, 70, 80, 90, 95, or 100 wt %. Within the inclusions, the hygroscopic material may be from about 50 wt % to 100 wt %, such as about 60, 70, 80, 90, 95, or 100 wt %, not including the nanomaterial.

The material may be characterized by a coefficient of friction, measured at 50% relative humidity, less than 0.9 and/or a coefficient of friction, measured at 85% relative humidity, less than 0.7. The material may be characterized by a delay in the formation of ice on a surface of the material.

In some variations, the invention provides a low-friction, low-adhesion material comprising:

a substantially continuous matrix including a low-surface-energy polymer having a surface energy between about 10 mJ/m$^2$ to about 40 mJ/m$^2$;

a plurality of inclusions, dispersed within the matrix, each comprising a hygroscopic material; and optionally a nanoporous material within at least some of the inclusions, wherein the nanopores have an average pore diameter less than 100 nanometers, wherein the continuous matrix and the inclusions support the formation of a lubricating surface layer.

In some embodiments, the material further includes voids. As intended herein, a "void" is a discrete region of empty space, or space filled with air or another gas, that is enclosed within the continuous matrix. The voids may be open (e.g., interconnected voids) or closed (isolated within the continuous matrix), or a combination thereof. The voids may partially surround inclusions or nanoparticles.

In various embodiments, the material is a coating and/or is present at a surface of an object or region.

Any known methods to fabricate these materials or coatings may be employed. Notably, these materials or coatings may utilize synthesis methods that enable simultaneous deposition of components or precursor materials to reduce fabrication cost and time. In particular, these materials or coatings may be formed by a one-step process, in some embodiments. In other embodiments, these materials or coatings may be formed by a multiple-step process.

The low-friction, low-adhesion hydrophobic or hydrophilic material, in some embodiments, is formed from a precursor material (or combination of materials) that may be provided, obtained, or fabricated from starting components.

The precursor material is capable of hardening or curing in some fashion, to form a substantially continuous matrix including a low-surface-energy polymer along with a plurality of hygroscopic inclusions, dispersed within the matrix, and optionally a nanoporous material within at least some of the inclusions. The precursor material may be a liquid; a multiphase liquid; a multiphase slurry, emulsion, or suspension; a gel; or a dissolved solid (in solvent), for example.

The low-surface-energy polymer and the hygroscopic material may be in the same phase or in different phases. In some embodiments, the low-surface-energy polymer is in liquid or dissolved form while the hygroscopic material is in dissolved-solid or suspended solid form. In some embodiments, the low-surface-energy polymer is dissolved-solid or suspended-solid form while the hygroscopic material is in liquid or dissolved form. In some embodiments, the low-surface-energy polymer and the hygroscopic material are both in liquid form. In some embodiments, the low-surface-energy polymer and the hygroscopic material are both in dissolved (solvent) form.

Some variations provide a precursor material for a low-friction, low-adhesion material, the precursor material comprising:

a hardenable material capable of forming a substantially continuous matrix, wherein the hardenable material includes a low-surface-energy polymer having a surface energy between about 5 mJ/m$^2$ to about 50 mJ/m$^2$; and a plurality of inclusions, dispersed within the hardenable material, each comprising a hygroscopic material.

In some embodiments of the precursor material, the surface energy of the polymer is between about 10 mJ/m$^2$ to about 40 mJ/m$^2$. The low-surface-energy polymer may be a fluoropolymer, for example, selected from the group consisting of perfluoroethers, fluoroacrylates, fluorosilicones, and combinations thereof. The low-surface-energy polymer may be a siloxane.

In some embodiments of the precursor material, the hygroscopic material is selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacrylate, monoacrylate, and combinations thereof.

In some embodiments, the hygroscopic material is also hardenable, either alone or in combination with the low-surface-energy polymer. For instance, a low-surface-energy polymer and a hygroscopic polymer may form a high-molecular-weight block copolymerize and thus harden (see Example 1). In certain embodiments, the hygroscopic material assists in the curability (hardenability) of the low-surface-energy polymer.

The precursor material may further comprise a nanoporous material within at least some of the inclusions, wherein the nanopores have an average pore diameter less than 100 nanometers, and wherein the nanoporous material optionally comprises a hydrophobic component and/or optionally is surface-modified to increase hydrophobicity. The nanoporous material may be selected from the group consisting of silica, alumina, silicates, aluminosilicates, carbonates, carbon, and combinations thereof. The nanoporous material is typically already in a solid state or solid-solution state, within the precursor material. During final curing it is possible for the nanoporous material to undergo additional chemical curing reactions or other reactions.

In some embodiments, a precursor material is prepared and then dispensed (deposited) over an area of interest. Any known methods to deposit precursor materials may be employed. A fluid precursor material allows for convenient dispensing using spray coating or casting techniques over a large area, such as the scale of a vehicle or aircraft.

The fluid precursor material may be applied to a surface using any coating technique, such as (but not limited to) spray coating, dip coating, doctor-blade coating, spin coating, air knife coating, curtain coating, single and multilayer slide coating, gap coating, knife-over-roll coating, metering rod (Meyer bar) coating, reverse roll coating, rotary screen coating, extrusion coating, casting, or printing. Because relatively simple coating processes may be employed, rather than lithography or vacuum-based techniques, the fluid precursor material may be rapidly sprayed or cast in thin layers over large areas (such as multiple square meters).

When a solvent is present in the fluid precursor material, the solvent may include one or more compounds selected from the group consisting of alcohols (such as methanol, ethanol, isopropanol, or tert-butanol), ketones (such as acetone, methyl ethyl ketone, or methyl isobutyl ketone), hydrocarbons (e.g., toluene), acetates (such as tert-butyl acetate), organic acids, and any mixtures thereof. When a solvent is present, it may be in a concentration of from about 10 wt % to about 99 wt % or higher, for example.

When a carrier fluid is present in the fluid precursor material, the carrier fluid may include one or more compounds selected from the group consisting of water, alcohols, ketones, acetates, hydrocarbons, acids, bases, and any mixtures thereof. When a carrier fluid is present, it may be in a concentration of from about 10 wt % to about 99 wt % or higher, for example.

The precursor material may be converted to an intermediate material or the final material using any one or more of curing or other chemical reactions, or separations such as removal of solvent, monomer, water, or vapor. Curing refers to toughening or hardening of a polymeric material by cross-linking of polymer chains, assisted by electromagnetic waves, electron beams, heat, and/or chemical additives. Chemical removal may be accomplished by heating/flashing, vacuum extraction, solvent extraction, centrifugation, etc. Physical transformations may also be involved to transfer precursor material into a mold, for example. Additives may be introduced during the hardening process, if desired, to adjust pH, stability, density, viscosity, color, or other properties, for functional, ornamental, safety, or other reasons.

The overall thickness of the final material or coating may be from about 1 µm to about 1 cm or more, such as about 10 µm, 20 µm, 25 µm, 30 µm, 40 µm, 50 µm, 75 µm, 100 µm, 500 µm, 1 mm, 1 cm, or 10 cm. Relatively thick coatings offer good durability and mechanical properties, such as impact resistance, while preferably being relatively lightweight.

EXAMPLES

Example 1: Hygroscopic-Fluoro Block Polymer

Polyethylene glycol ($M_n$=3400) is dried using a freeze dryer overnight and the powder (2.55 g) is charged to a vial followed by hexamethylene diisocyanate, HMDI (1.97 g). A small PTFE-coated stir bar is introduced and the vial placed in a 100° C. oil bath to stir. Once the polymer has melted and dissolved in the HMDI, a small drop of dibutyltin dilaurate (~10 µL) is added and stirred into the mix. The reaction mixture is left to stir for 1 hour.

Following this period, Flurolink D4000 pefluoroether (3 g) is injected into the mixture and then promptly vortexed to homogenize before returning to the 100° C. oil bath. The mixture quickly thickens over the course of 5 minutes, where it is vortexed again before being left for 1 hour. At the end of this period the vial is taken off the heat and THF (2 mL) added to the viscous resin and vortexed to disperse and thin the overall mixture (precursor material). While still warm, butanediol (540 mg) is dissolved in THF (1 mL) and injected into the precursor material and promptly vortexed. Shortly after this step, the precursor material resin is poured into a 3"×3" PTFE mold to flash off solvent and cure the precursor material film at room temperature overnight.

The next day the film is placed in an 80° C. oven for 4 hours to complete the cure before a portion is flattened on a hot press at 100° C. using a shim of ~0.5 mm to control film thickness. A phase-contrast AFM (atomic force microscopy) image of a through-depth section of this material film is shown in FIG. 3. The data shows microphase separation of the fluoro and hygroscopic sections of the polymer. In particular, FIG. 3 is an AFM image of Example 1 showing clear phase separation into soft oblong regions (darker regions in the image) surrounded by a continuous stiffer matrix.

When exposed to 90% humidity for 30 minutes, this sample increases 25.2 wt % in mass, which is indicative of the amount of water absorbed by the hygroscopic component of the polymer.

Example 2: Hygroscopic-Fluoro Block Polymer

Polyethylene glycol ($M_n$=3400) is dried using a freeze dryer overnight and the powder (2.55 g) is charged to a vial followed by hexamethylene diisocyanate, HMDI (1.97 g). A small PTFE-coated stir bar is introduced and the vial placed in a 100° C. oil bath to stir. Once the polymer has melted and dissolved in the HMDI, a small drop of dibutyltin dilaurate (~10 µL) is added and stirred into the mix. The reaction mixture is left to stir for 1 hour.

Following this period, Flurolink D4000 pefluoroether (3 g) is injected into the mixture and then promptly vortexed to homogenize before returning to the 100° C. oil bath. The mixture quickly thickens over the course of 5 minutes and it is vortexed again before being left for 1 hour. At the end of this period, the vial is taken off the heat and THF (2 mL) added to the viscous resin and vortexed to disperse and thin the overall mixture. While still warm, Jeffamine D230 with ketamine end groups (2.36 g) is injected into the mixture and promptly vortexed. Shortly after this step, the resin is poured into a 3"×3" PTFE mold to flash off solvent and cure the film at room temperature overnight.

The next day the film is placed in an 80° C. oven for 4 hours to complete the cure. Then a portion is flattened on a hot press at 100° C. using a shim of ~0.5 mm to control film thickness.

When exposed to 90% humidity for 30 minutes, this sample increases 26.0 wt % in mass, which is indicative of the amount of water absorbed by the hygroscopic component of the polymer.

Example 3: Fluoropolymer Control

Flurolink D4000 pefluoroether (4 g) is charged to a vial followed by HMDI (0.786 g). A small PTFE-coated stir bar is introduced and the vial placed in a 100° C. oil bath to stir.

The reaction is vortexed aggressively after achieving a temperature of 100° C., and then left to stir for 1 hour. After this step, the resin is poured into a 3"×3" PTFE mold to flash off solvent and cure the film at room temperature overnight.

Example 4: Textured Hygroscopic-Fluoro Block Polymer

Butanediol is mixed with the Example 1 polymer and vortexed. Then an aliquot of the liquid is cast onto the patterned fluropolymer of Example 5. A polyethylene sheet is placed onto the stamp to remove excess polymer. The filled stamp is then allowed to cure at ambient temperature overnight, placed in an 80° C. oven for 4 hours, and then peeled away from the fluoropolymer mold.

Example 5: Textured Fluoropolymer

A patterned PFPE-DMA (perfluoropolyether dimethacrylate) mold is generated by pooling PFPE-DMA containing 1-hydroxycyclohexyl phenyl ketone over a patterned silicon substrate. A poly(dimethylsiloxane) gasket is used to confine the pooled PFPE-DMA precursor to the desired area on the silicon substrate. These mold fabrication materials are placed in a small UV-curing chamber and the chamber is purged with nitrogen for 5 minutes. Polymerization of the PFPE-DMA precursors is accomplished by UV photoirradiation (wavelength of 365 nm) for 10 minutes while remaining under the nitrogen purge. The fully cured PFPE-DMA elastomeric mold is then released from the silicon master and used for molding applications.

The procedure in this Example 5 may be utilized to form a fluoropolymer with wells or 3D pillars, for instance, followed by filling the wells (e.g., Example 6), or surrounding the pillars, with a hygroscopic material.

Example 6: PAA-Filled Textured Fluoropolymer

Polyacrylic acid is dissolved in an ethanol/water solution. The mixture is airbrushed onto the patterned fluropolymer provided by Example 5. A polyethylene sheet is placed onto the stamp to remove excess PAA. The filled stamp is allowed to dry, leaving the PAA in the pores of the patterned stamp.

Example 7: Contact Angle and Friction Testing

The change in friction in response to humidity is tested by equilibrating the samples of Examples 1-6 at ambient (40-55%) relative humidity or 90% relative humidity in a humidity-controlled chamber. Then the samples are placed on a variable-angle stage and the angle is increased until a 5-gram cylindrical mass slides along the sample surface. The sliding angle is used to determine the friction constant (coefficient of friction). The friction change as well as water and oil contact angles are shown for the samples of Examples 1-6 in the table of FIG. 4.

Both Example 1 and Example 2 samples have contact angles similar to the pure fluoropolymer control (Example 3); however, they show lower overall friction, and in the case of Example 1, a greater decrease in friction with humidity. This shows that the fluoropolymer block is creating a low-adhesion surface while the hygroscopic block is absorbing water that creates overall reduced friction as compared to the fluoropolymer control (Example 3).

These materials (Example 1 and Example 2) differ significantly from typical hygroscopic materials that would have a very low water contact angle and high friction. The high water contact angle in our materials means that drops will better slide across the surface and create lubrication. The moderate oil (hexadecane) contact angle shows that oil will not spread over the surface, which would render it ineffective.

The Example 4 sample is the Example 1 polymer formed with an array of 3D wells in the surface. This texturing results in overall lower friction than the Example 1 coating material from which it is made, or a textured pure fluoropolymer (Example 5).

When the Example 5 textured fluoropolymer is filled with a hygroscopic material (Example 6), it shows a larger decrease in friction with increasing humidity as compared to Example 5 (34% compared to 22%), due to water from the air being absorbed into the hydroscopic material and providing additional lubricity. The hygroscopic material of Example 6 also increases the lipophobicity without compromising much hydrophobicity.

Example 8: Ice Formation Testing

The kinetic delay of freezing is measured by placing three 50 μL drops of deionized water on a surface held at −10° C. with a thermoelectric cooler. The time for ice to initially form in the droplets is measured. A bare aluminum surface has an ice formation delay of 13±6 seconds. The Example 3 fluoropolymer control demonstrates an ice formation delay of 1 min 18 seconds±53 seconds. The Example 1 hygroscopic-fluoro block copolymer demonstrates an ice formation delay of 27 min 43 seconds±41 seconds.

The surprisingly long ice formation delay of the Example 1 material may be due to the material trapping water at the surface. Without being limited by theory, it is believed that this trapped layer of water cannot freeze because the hydroscopic domains inhibit the crystallization reaction mechanisms in the surface water. Any droplet of water on the surface sees liquid water instead of a coating on the surface; ice nucleation is confined to the homogeneous nucleation regime that is kinetically much slower than heterogeneous nucleation.

Vehicle-based cameras for surrounding awareness will require lens coatings that will inhibit soiling in order to function. Once soiled, the camera will lose effectiveness and eventually cease functioning. The coatings/surfaces described herein may be used as camera lens coatings, and may be transparent.

Aircraft lose efficiency from disruption of laminar flow when insect and particulate debris collect on the aircraft wings. This invention provides materials that reduce the adhesion of insect and particulate debris on aircraft surfaces, while simultaneously inhibiting the formation of ice.

Other practical applications for the present invention include, but are not limited to, vehicle windows, optical lenses, filters, instruments, sensors, eyeglasses, cameras, satellites, and weapon systems. For example, automotive applications can utilize these coatings to prevent the formation of ice or debris on back-up camera lenses or back-up sensors. The principles taught herein may also be applied to self-cleaning materials, anti-adhesive coatings, corrosion-free coatings, etc.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A precursor material for a low-friction, low-adhesion material, said precursor material comprising:
    a hardenable material capable of forming a substantially continuous matrix, wherein said hardenable material consists of a low-surface-energy polymer having a surface energy between about 5 mJ/m$^2$ to about 50 mJ/m$^2$; and
    a plurality of inclusions, dispersed within said hardenable material, each comprising a hydrophilic and hygroscopic material,
    wherein said inclusions are covalently connected to said low-surface-energy polymer.

2. The precursor material of claim 1, wherein said surface energy of said polymer is between about 10 mJ/m$^2$ to about 40 mJ/m$^2$.

3. The precursor material of claim 1, wherein said low-surface-energy polymer is a fluoropolymer.

4. The precursor material of claim 3, wherein said fluoropolymer is selected from the group consisting of perfluoroethers, fluoroacrylates, fluorosilicones, and combinations thereof.

5. The precursor material of claim 1, wherein said low-surface-energy polymer is a siloxane.

6. The precursor material of claim 1, wherein said hygroscopic material is selected from the group consisting of poly(acrylic acid), poly(ethylene glycol), poly(2-hydroxyethyl methacrylate), poly(vinyl imidazole), poly(2-methyl-2-oxazoline), poly(2-ethyl-2-oxazoline), poly(vinylpyrolidone), cellulose, modified cellulose, carboxymethyl cellulose, hydroxyethyl cellulose, hydroxypropyl cellulose, methyl cellulose, hydrogels, PEG diacryalate, monoacrylate, and combinations thereof.

7. The precursor material of claim 1, said precursor material further comprising a nanoporous material within at least some of said inclusions, wherein said nanopores have an average pore diameter less than 100 nanometers, and wherein said nanoporous material optionally comprises a hydrophobic component and/or optionally is surface-modified to increase hydrophobicity.

8. The precursor material of claim 7, wherein said nanoporous material is selected from the group consisting of silica, alumina, silicates, aluminosilicates, carbonates, carbon, and combinations thereof.

9. The precursor material of claim 1, wherein said inclusions are covalently connected to said low-surface-energy polymer in a block copolymer.

* * * * *